United States Patent [19]

Kawai

[11] 4,343,024
[45] Aug. 3, 1982

[54] DEVICE FOR DETECTING TAPE END OF MAGNETIC RECORDING APPARATUS

[76] Inventor: Tsutomu Kawai, 28, Ogawa-cho, Yokosuka-shi, Kanagawa-ken, Japan

[21] Appl. No.: 147,832

[22] Filed: May 8, 1980

[51] Int. Cl.³ .............................................. G11B 15/00
[52] U.S. Cl. ................................ 360/74.6; 242/188; 360/74.5; 360/132
[58] Field of Search ............. 360/74.6, 74.5, 132–133; 242/188

[56] References Cited

U.S. PATENT DOCUMENTS

| 3,614,453 | 10/1971 | Johnson | 360/74.6 |
| 3,751,042 | 8/1973 | Platt | 360/96.5 |
| 4,091,426 | 5/1978 | Umeda | 360/74.6 |

FOREIGN PATENT DOCUMENTS

| 1254377 | 11/1967 | Fed. Rep. of Germany | 242/188 |
| 600479 | 6/1978 | Switzerland | 360/74.6 |

OTHER PUBLICATIONS

IBM Tech. Disc. Bull., S. D. Roberts, Optimized Tape-Mark Detector, vol. 12, No. 12, May 1970, pp. 2354–2355.

Primary Examiner—Alfred H. Eddleman
Attorney, Agent, or Firm—Fisher, Christen & Sabol

[57] ABSTRACT

A video tape cassette of the type wherein a supply reel and a take-up reel are contained therein holds a magnetic video tape having transparent sections of tape at each end connected to a respectively one of the reels. A light-receiving element, or sensor, such as a phototransistor is incorporated into one of the positioning poles which enters into a cooperating opening in the cassette when it is put into position, and a light-emitting element, such as a light emitting diode is provided on the base outside of the cassette so that the end of the tape can be detected by the cooperative action of these two elements to automatically stop the running of the tape. Since the light-receiving element can be incorporated into the existing positioning pole, no additional space is required and the device can be incorporated into already existing video tape recorders. Obviously, the same results can be achieved if the phototransistor and light-emitting diode are interchanged.

4 Claims, 11 Drawing Figures

DEVICE FOR DETECTING TAPE END OF MAGNETIC RECORDING APPARATUS

BRIEF SUMMARY OF THE INVENTION

This device relates to means for detecting the end of a tape used in magnetic recording apparatus.

A primary object of the device is to provide means capable of detecting the end of a tape used in magnetic recording apparatus surely and quickly by means of a light-emitting element, such as a light-emitting diode, and a light-receiving sensor, such as a phototransistor, which can be incorporated into existing magnetic recording apparatus such as a video tape recorder. Either the light-receiving element, or the light-emitting one can be incorporated into the usual positioning pole, so that no special space must be provided.

DESCRIPTION OF A PREFERRED EMBODIMENT

Figure 1:
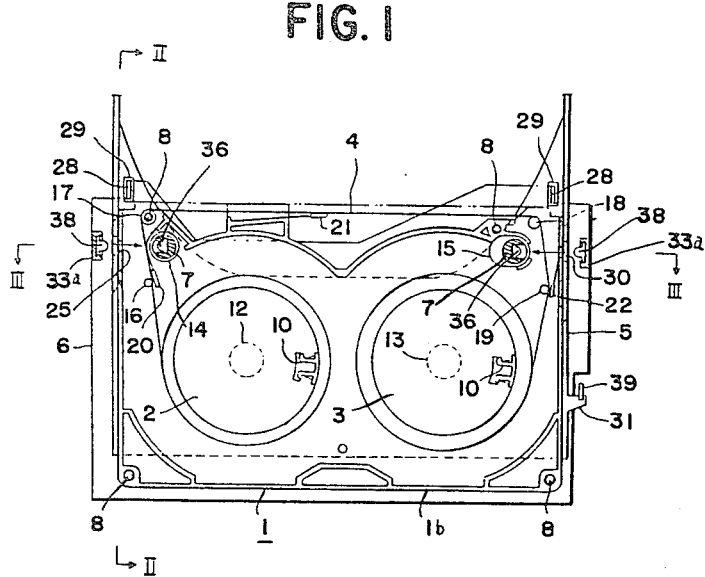
FIG. 1 is a fragmentary sectional plan view of the cassette holding portion of a video tape recorder equipped with a device for detecting the tape end according to the present invention.

In FIG. 1 there is shown a sectional plan view of a cassette in place on the receiving plate of a video recorder, showing the interior arrangement of the elements according to this invention. The cassette is identified by numeral 1, containing a magnetic tape 4 extending between a supply reel 2 and a take-up reel 3.

Numeral 5 denotes a receiving plate on which the cassette 1 is placed, the remote ends of the place being pivotally attached to the video tape recorder frame so that the plate may be tilted upwardly to receive a cassette and to be tilted downwardly on to the base 6.

The base 6 is provided with a pair of upwardly projecting positioning poles which position the cassette when plate 5 is on its downwardly tilted position.

Referring to FIGS. 4 through 8, it will be seen that cassette 1 comprises upper and lower matching casings 1a and 1b which are securely fastened together by four small screws 8. The cassette contains a video tape 4 having transparent sections 9 at each end, which are respectively connected to a supply reel 2 and take-up reel 3.

Figure 7:
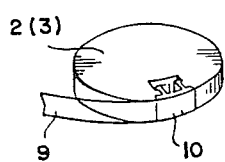
FIG. 7 is a fragmentary perspective of a tape reel showing the attachment of the end portion of the tape.

As seen in FIG. 7, the ends of the transparent sections 9 are attached to the reels 2 and 3 by pi-shaped clips 10.

The reels have inwardly directed projections 2b and 3b formed in the respective central cores 2a and 3a which engage with the supply reel and take-up reel driving shafts 12 and 13 which project upwardly through openings 11 in the lower half 1b of the cassette.

Further, the lower half 1b of the cassette is provided with a plurality of tape guides 16, 17, 18 and 19, in addition to openings 14 and 15, through which the positioning poles project.

Figure 8:
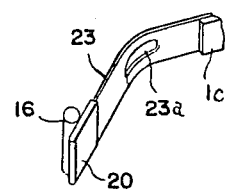
FIG. 8 is a fragmentary perspective view of a tape guide and pad in the cassette.

The lower portion of the cassette is also provided with tape pads 20, 21 and 22, and a flexible strip 23, provided with an elongated aperture 23a, supports pad 20 from an upstanding rib 1c, as shown in FIGS. 1 and 8.

A closure lid 24 is pivotally attached to one open side of the cassette and apertures 25 are provided at each end of the cassette where the margins of the upper and lower portions meet, in order to allow the passage of light from a light-emitting diode to a phototransistor, as will be later described.

Figure 2:
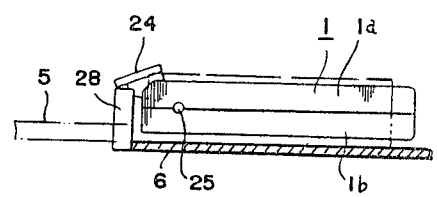
FIG. 2 is a section taken on the line II—II of FIG. 1.
Figure 6:
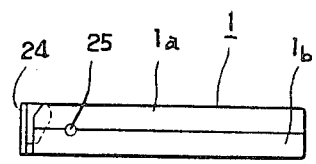
FIG. 6 is an end elevation of the cassette.

The receiving plate 5 consists of a horizontal portion 5a which supports the bottom 1b of the cassette and is provided with upstanding side walls 5b which confine the ends of the cassette. Openings 26 are provided in the portion 5a, large enough to allow passage of the shafts 12 and 13 for driving the reels and openings 27 are provided to permit passage of positioning poles 7 into the cassette, while rectangular opeings 29 allow passage of projections 28 for opening the cover 24, as seen in FIG. 2.

Apertures 30 are provided in the upturned portions 5b to allow passage of light therethrough, as will be described, and a latch 31 is integrally formed on one of the portions for securely holding the receiving plate 5 on the base 6 when in place.

Figure 11:
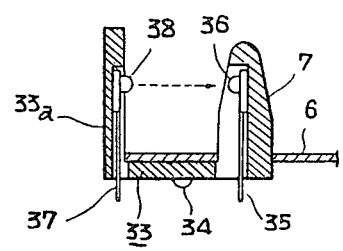
FIG. 11 is an enlarged fragmentary sectional view taken on the line XI—XI of FIG. 10.
Figure 9:
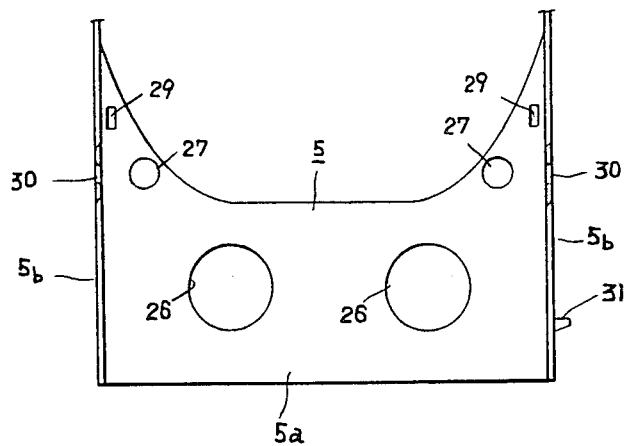
FIG. 9 is a plan view of the tiltable receiving plate on the recorder which holds the cassette.
Figure 10:
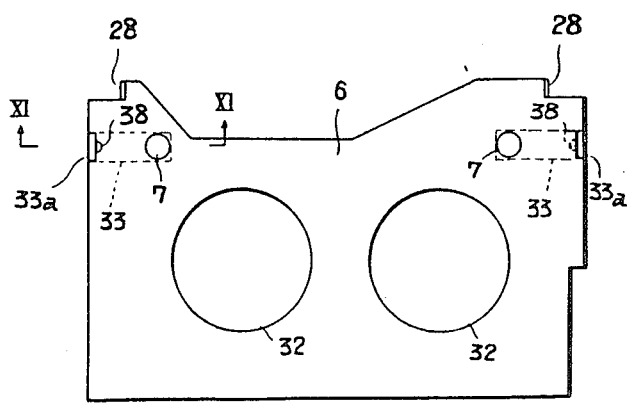
FIG. 10 is a plain view of the base on the recorder which supports the receiving plate of FIG. 9.

Referring to FIGS. 10 and 11, the base 6 is provided with openings 32, sufficiently large to allow passage of shafts 12 and 13 and the projections 28, for opening the cover 24 are formed by bending up a small section of each side margin.

U-shaped elements 33 incorporates a tapered positioning pole as one of the upstanding legs while the other leg 33a serves as a support for a light source such as light-emitting diode 38 with lead wire 37. A light sensor, such as a phototransistor 36, with its lead wire 36 fitted into a recess in pole 7. The whole assembly is secured to the base by a screw 34.

Latching member 31 engages with the hook 39, shown in FIG. 1 to hold receiving plate 5 in its downward positions.

Figure 3:
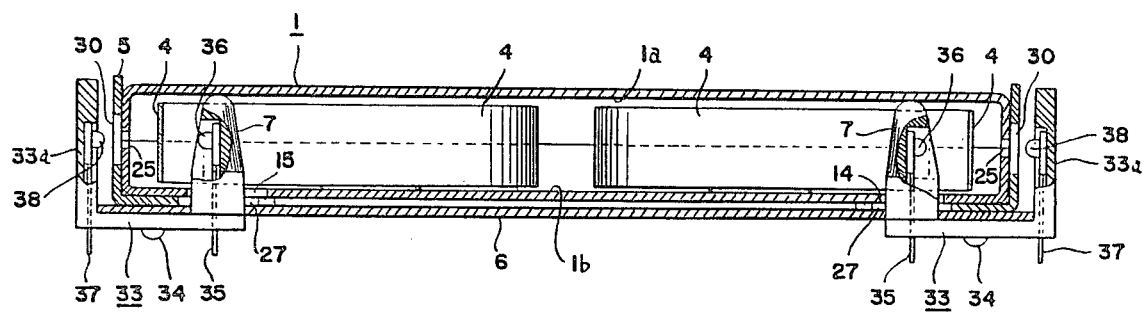
FIG. 3 is a section taken on the line III—III of FIG. 1 on an enlarged scale.
Figure 4:
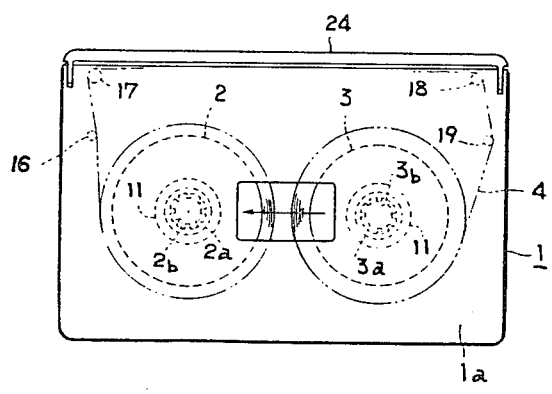
FIG. 4 is a plan view of a cassette.
Figure 5:
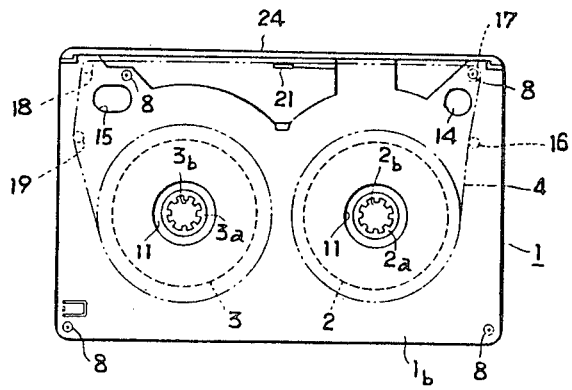
FIG. 5 is a view of the exterior bottom of the cassette.

In operation, the cassette is slid into place on receiving plate 5 which is then tiled down to be latched by hook 39. At the same time projections 28 engage the cover 24 to swing it open, as in FIG. 2. The supply and take-up reel driving shafts 12 and 13 also become engaged with the centers 2a and 3a and as in FIG. 3 the positioning poles 7 are inserted into openings 14 and 15 of the cassette through openings 27 of receiving plate 5.

Thus, when the cassette is in operating position, light from the light-emitting diode 38 is cast into the cassette through openings 30 and 25 and falls on the normally opaque portions of magnetic tape 4, none of this light reaches the phototransistor 36.

When the tape 4 is taken up on one of the reels 2 or 3 during operation of the video tape recorder and the other end of the tape appears at the other reel, the transparent end portion 9 is exposed to the light coming from a light-emitting diode 38 which passes through openings 30 and 25. Accordingly, light from a light-emitting diode 38 reaches a phototransistor 36 through openings 30 and 25 and the transparent portion 9 of the tape 4 to detect an end of the video tape.

When the end of the tape is detected in this way the output of the phototransistor 36 is amplified for actuating an automatic stop mechanism which causes the video tape 4 to stop automatically.

I claim:

1. In a device for detecting a transparent portion of a normally opaque magnetic tape carried on a pair of reels arranged side by side within a cassette having openings in the bottom for positioning the cassette and an opening along one side to allow removal of an intermediate length of tape during operation and end openings in horizontal alignment with the plane of the tape, said cassette being initially supported on a tiltable receiving plate which is lowered downwardly to be supported on a fixed base plate when the cassette is in use, both of said plates being provided with openings to accomodate cassette reel driving shafts and cassette positioning poles, the combination comprising:

a unitary assembly comprising a generally U-shaped member having embedded in the upper portions of the respective upstanding legs thereof a light source, and light sensor to be responsive to the direct radiation from said light source;

the intermediate portion of said member being an elongated flat section to lie against the under side of said base plate;

one of said upstanding legs having an upwardly and inwardly tapering circular cross-section defining a positioning pole for a cassette to project upwardly through aligned openings in said plates;

the other of said upstanding legs to be disposed closely adjacent the exterior of one end of a cassette at the location of an end opening;

said light source being positioned when said flat section lies against the under side of the base plate to project radiation in a path to pass through the end opening of the cassette to be directly received by the light sensor after being intercepted by the tape.

2. Device as defined in claim 1, wherein said light source is embedded in said one of the upstanding legs defining a positioning pole.

3. Device as defined in either one of claims 1 or 2, wherein the other of said upstanding legs comprises a flat strip lying in a plane parallel with the end surface of a cassette.

4. Device as defined in claim 3, wherein said light sensor is embedded in said flat strip.

* * * * *